(12) United States Patent
Bryce et al.

(10) Patent No.: US 7,987,294 B2
(45) Date of Patent: Jul. 26, 2011

(54) UNIFICATION OF MULTIMEDIA DEVICES

(75) Inventors: Stuart Bryce, Crows Nest (AU);
Tomasz Celinski, Elizabeth Bay (AU);
Adam J. Kent, Lilyfield (AU)

(73) Assignee: Altec Lansing Australia Pty Limited, Sydney (AU)

( * ) Notice: Subject to any disclaimer, the term of this patent is extended or adjusted under 35 U.S.C. 154(b) by 843 days.

(21) Appl. No.: 11/872,931

(22) Filed: Oct. 16, 2007

(65) Prior Publication Data
US 2008/0242222 A1  Oct. 2, 2008

Related U.S. Application Data

(60) Provisional application No. 60/829,711, filed on Oct. 17, 2006.

(51) Int. Cl.
*G06F 15/16* (2006.01)
(52) U.S. Cl. ........ 709/248; 709/208; 709/209; 709/218; 709/231
(58) Field of Classification Search .................. 709/208, 709/209, 218, 231, 248
See application file for complete search history.

(56) References Cited

U.S. PATENT DOCUMENTS

| | | | | |
|---|---|---|---|---|
| 6,167,046 A * | 12/2000 | Terada et al. | ............... | 370/389 |
| 6,243,707 B1 * | 6/2001 | Humpleman et al. | ............. | 1/1 |
| 6,466,832 B1 | 10/2002 | Zuqert et al. | | |
| 6,954,641 B2 | 10/2005 | McKenna et al. | | |
| 7,490,293 B1 * | 2/2009 | Humpleman et al. | ........ | 715/734 |
| 7,668,990 B2 * | 2/2010 | Krzyzanowski et al. | ....... | 710/72 |
| 2002/0133764 A1 | 9/2002 | Wang et al. | | |
| 2003/0103088 A1 * | 6/2003 | Dresti et al. | .................. | 345/835 |
| 2003/0220988 A1 * | 11/2003 | Hymel | .......... | 709/220 |
| 2003/0224807 A1 * | 12/2003 | Sinha et al. | .................... | 455/463 |
| 2003/0236890 A1 * | 12/2003 | Hurwitz et al. | ............... | 709/227 |
| 2004/0160928 A1 | 8/2004 | Perlman | | |
| 2005/0108369 A1 * | 5/2005 | Sather et al. | .................. | 709/220 |
| 2005/0128048 A1 * | 6/2005 | Krzyzanowski et al. | .... | 340/3.71 |
| 2005/0141469 A1 | 6/2005 | Miller et al. | | |
| 2005/0169193 A1 | 8/2005 | Black et al. | | |
| 2005/0288805 A1 | 12/2005 | Moore et al. | | |
| 2006/0085825 A1 * | 4/2006 | Istvan et al. | ..................... | 725/86 |
| 2006/0174116 A1 | 8/2006 | Balfanz et al. | | |
| 2007/0005783 A1 * | 1/2007 | Saint-Hillaire et al. | ...... | 709/230 |
| 2007/0192833 A1 | 8/2007 | Ho et al. | | |
| 2007/0226346 A1 * | 9/2007 | Hyvarinen et al. | ........... | 709/227 |

FOREIGN PATENT DOCUMENTS

| | | |
|---|---|---|
| EP | 1380918 | 1/2004 |
| GB | 2402302 | 8/2005 |

\* cited by examiner

*Primary Examiner* — Phuoc Nguyen
(74) *Attorney, Agent, or Firm* — Tarolli, Sundheim, Covell & Tummino LLP

(57) ABSTRACT

Described herein are various methods and systems relating to the unification of media devices, and more specifically to the provision of wireless audio systems. In overview, two or more wireless speaker subsystem units substantially autonomously form a single wireless audio system having its own control interface. This control interface is used to apply operational changes across the wireless audio system, such as volume adjustment. That is, an operational change may be applied to the system as a whole, and this change is subsequently implemented by each of the individual wireless speaker subsystem units.

27 Claims, 13 Drawing Sheets

UNIFICATION OF MULTIMEDIA DEVICES

RELATED APPLICATION(S)

The present invention claims benefit of priority of U.S. Provisional Patent Application No. 60/829,711 filed 17 Oct. 2006 to inventors Bryce et al., The contents of such U.S. 60/829,711 are incorporated herein by reference.

FIELD OF THE INVENTION

This invention relates to the unification of multimedia devices, and more particularly to methods for providing wireless audio systems.

BACKGROUND

A wireless audio system includes a plurality of discrete wireless speaker subsystems, these wireless speaker subsystems typically interacting using a wireless networking standard such as the IEEE 802.11 standard. Each wireless speaker subsystem typically includes a central processing unit coupled to a memory unit, a networking interface and audio output hardware—such as an amplifier and one or more speaker cones. The central processing unit provides a media rendering functionality whereby data indicative of audio received via the networking interface is processed to provide a corresponding audible output via the audio output hardware.

There are two major approaches for configuring a wireless audio system. The first of these approaches involves pre-purchase configuration, whereby a plurality of wireless speaker subsystems are, as part of the manufacturing process, designated to be a wireless speaker set and in that way configured to act as a single wireless audio system. Each wireless speaker subsystem in the set includes data indicative of instructions to form a predefined wireless audio system with the other wireless speaker subsystems in that set—to the exclusion of other wireless speaker subsystems. A consumer purchases the wireless speaker subsystems as a set, and they behave accordingly without the need for substantive post-purchase configuration. This approach leads to difficulties where a particular wireless speaker subsystem requires replacement—for example following damage. Replacing a wireless speaker subsystem in such cases often involves obtaining a wireless speaker subsystem that has been pre-configured in same manner as the wireless speaker subsystem being replaced.

The second approach involves end-user configuration. Under such an approach, wireless speaker subsystems are manufactured and sold individually with no specific pre-configuration to any particular set. A consumer purchases a plurality wireless speaker subsystems, and subsequently configures these wireless speaker subsystems to provide a wireless audio system.

Ideally, it would be preferable for the wireless speaker subsystems perform some automatically self-configuration to assist in the configuration of a wireless audio system from non-pre-configured wireless speaker subsystems. There is a need in the art for devices, systems and methods that assist in this regard.

SUMMARY

Described herein are devices, systems and methods relating to the unification of multimedia devices, predominately for the purposes of configuring wireless audio systems.

One embodiment includes a method for providing a multimedia system including one or more wireless multimedia devices. The method includes the steps of discovering the devices on a wireless network; defining as a group a wireless multimedia system including the devices; providing via the group a system control interface for receiving a system control signal indicative of an operational change to the multimedia system; and being responsive to the system control signal for providing respective corresponding device control signals to the devices to implement the operational change across the multimedia system. Another embodiment includes a computer-readable medium encoded with instructions that when executed by one or more processors carry out the method.

One embodiment includes a method performed by a wireless multimedia device for providing a multimedia system including the device and none or more complementary wireless multimedia devices. The method includes: connecting to a wireless network; undergoing a discovery process on the wireless network for allowing mutual discovery of the device and the none or more complementary devices; determining whether the device is a group leader relative to the none or more complementary devices; and in the case the device is the group leader: defining a group representative of a wireless multimedia system including the device and the none or more complementary devices, providing via the group a system control interface for receiving a system control signal indicative of an operational change to the multimedia system; and being responsive to the system control signal for providing respective corresponding device control signals to the devices to implement the operational change across the multimedia system.

One embodiment includes a method performed by a wireless multimedia device to provide a multimedia "zone", which includes the device, the none or more complementary wireless multimedia devices, and none or more complementary multimedia systems. The method includes: connecting to a wireless network, undergoing a discovery process on the wireless network for allowing mutual discovery of the device, the none or more complementary devices, and the none or more complementary multimedia systems, determining whether the device is a zone leader relative to the none or more complementary multimedia systems; and in the case the device is the zone leader: defining a zone representative of the device, the none or more complementary wireless multimedia devices, and the none or more complementary multimedia systems, providing via the zone a system control interface for receiving a system control signal indicative of an operational change to the multimedia system, and being responsive to the system control signal for providing respective corresponding device control signals to the devices to implement the operational change across the zone.

One embodiment includes a method performed by a wireless multimedia device wherein the information gathered from the network discovery process is stored in memory on the device, such that the device does not have to run a new discovery process each time it is turned off and on.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

DESCRIPTION OF EXAMPLE EMBODIMENTS

Figure 1:
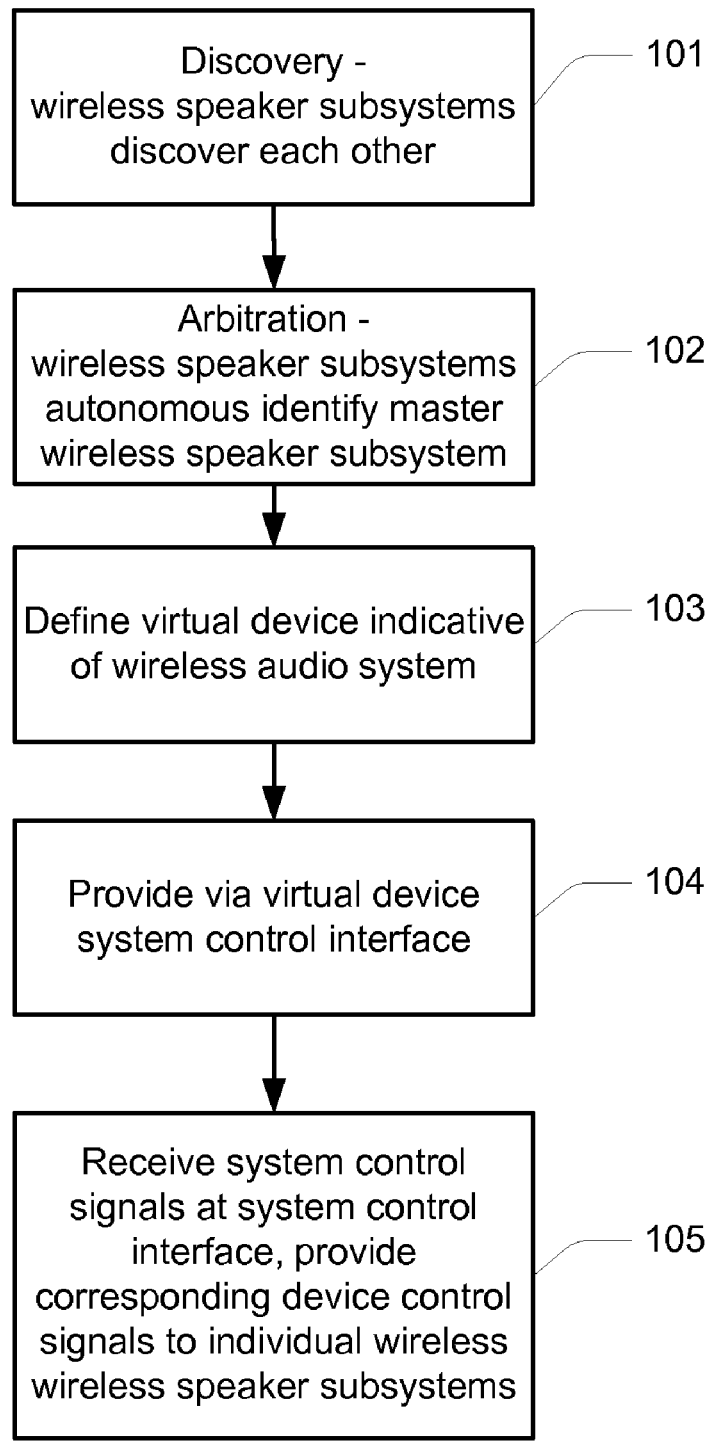
FIG. 1 shows a flowchart of one method embodiment for providing a wireless audio system.

Embodiments of the invention described herein are applicable to networked digital media playback devices. A network digital media playback device is a device that is capable of rendering digital media delivered to it via a computer network. In much of the description herein, wireless speakers are used as an example of networked digital media player. Those of ordinary skill in the art would readily be able to modify the description provided herein that is for wireless speakers and apply the methods and apparatuses to other discrete media playback devices. The description is provided in terms of wireless speakers in order to keep the description simple and not obscure the inventive concepts.

A networked digital media playback system is a system that allows one or more devices connected via a computer network to render digital media. In much of the description herein, a wireless audio system is used as an example of a networked digital media playback system. Those of ordinary skill in the art would readily be able to modify the description provided herein that is for a wireless audio system and apply the methods and apparatuses to other digital media playback systems. The description is provided in terms of a wireless audio system in order to keep the description simple and not obscure the inventive concepts.

Described herein are various methods and systems relating to the unification of media devices, specifically described by reference to the provision of wireless audio systems. In overview, one or more wireless speaker systems substantially autonomously form a single wireless audio system—also referred to as a "group"—having its own control interface. This control interface is used to apply operational changes across the wireless audio system, such as volume adjustment. That is, an operational change may be applied to the system as a whole, and this change is subsequently implemented as appropriate by each of the individual wireless speaker subsystem units.

Separate groups of media devices can also be unified into a single, autonomous "zone". Similar to a group of media devices, a zone of groups has its own control interface. This control interface is used to apply operational changes across the zone. That is, an operational change may be applied to the zone as a whole, and this change is subsequently implemented as appropriate by each of the individual groups of audio devices.

In the context of this disclosure, a wireless speaker subsystem unit, also referred to as a "wireless speaker subsystem" or "wireless speaker subsystem", is a hardware device having a processing unit coupled to a memory unit, wireless networking interface and audio output hardware, such as an analog-to-digital converter, an audio amplifier, and one or more speaker cones. The processing unit provides a media rendering functionality whereby data indicative of audio received via the networking interface is processed to provide a corresponding audible output via the audio output hardware. The memory unit contains instructions for the operation of the speaker subsystem, such as instructions to carry out methods described herein. An exemplary speaker subsystem according to an embodiment of the present invention is provided in FIG. 10, this figure being discussed further below.

A wireless audio system includes one or more wireless speaker subsystems. In a simple example, a wireless audio system includes a group of wireless speaker subsystems arranged throughout a room, and configured to playback the same audio in synchronicity. In a more complex example each wireless speaker subsystem's playback is defined by a role for that wireless speaker subsystem—for example in the context of a stereo configuration, or a five-channel surround sound configuration, or some other surround sound configuration.

In some cases a wireless audio system includes only a single wireless speaker subsystem.

FIG. 1 is a flowchart that illustrates a method according to an embodiment of the present invention for providing a multimedia system in the form of a wireless audio system. In overview, several individual wireless speaker subsystems are activated, each wireless speaker subsystem including a wireless network interface for allowing connection to a wireless network, e.g., a wireless local area network (WLAN) conforming to the IEEE 802.11 standard. These wireless speaker subsystems connect to a common wireless network—for example by association to an open access point.

The method of FIG. 1 is described by reference to a number of sub-processes. It will be appreciated that in various embodiments these sub-processes are performed in parallel or series. Sub-process ordering and particular examples should not be regarded as limiting.

Sub-process 101 represents a discovery sub-process where the wireless speaker subsystems are discovered by one another and by other devices on the network. In practical terms, discovery is a process whereby networked devices—including the wireless speaker subsystems and other devices—share data indicative of themselves and advertise their respective capabilities. For example, a wireless speaker subsystem advertises capabilities including wireless audio playback. A significant result taken from sub-process 101 is that the wireless speaker subsystems discover one another. Sub-process 101 is discussed in greater detail further below by reference to a specific example.

At sub-process 103 a virtual device is defined. A virtual device is a device which presents a single proxy interface to a collection of networked media devices to allow for a single control interface to these devices. Furthermore, a virtual device is a networked device that does not have a conventional hardware manifestation. Both the terms "group" and "zone" as used in this disclosure are virtual devices. In the example described herein, the virtual device is referred to as a "group" because it represents a plurality of networked multimedia devices (the wireless audio system).

In the present embodiment, a virtual device (a group or a zone) does not have a conventional hardware manifestation in the sense that the wireless audio system includes several individual wireless speaker subsystems. Virtual devices are discoverable on a network in the same way as physical devices. Physical devices communicate with virtual devices as they would with other physical devices. In the present embodiment a virtual device has its own IP address. In other embodiments however a virtual device does not have IP addresses, for example as a result of a lower-level protocol running atop that virtual device. In some embodiments a virtual device includes one or more virtual sub-devices, and the virtual device has an IP address whilst the virtual sub-devices may or may not have respective IP addresses.

At sub-process 104 a system control interface is provided via the group. This interface is enabled for receiving a system control signal indicative of an operational change to the wireless audio system. In particular, a signal or message provided to the group (for example by using the IP address of that device) is received by the system control interface. The term "operational change" should be read broadly to include substantially any change in state of any device either physical or virtual. For example: in the present context operational changes might include wireless speaker subsystem volume adjustment, other audio amplification settings, media playback control, and so on.

Providing the system control interface in some embodiments includes advertising on the network the group—for example in accordance with one or more open or other proprietary networking protocols. The group advertises the capability of a wireless audio system, and this capability is discoverable and controllable on the network. A user wishing to apply an operational change across the wireless audio system—such as a volume adjustment—provides a system control signal indicative of this change to the group. This is dealt with at sub-process 105.

At sub-process 105, a system control signal is received. In response to the system control signal, corresponding device control signals are provided to each of the wireless speaker subsystems to implement the operational change across the wireless audio system.

The term "system control signal" refers to a signal, message or data packet that is directed to the group for applying an operational change across the wireless audio system. A device control signal is a signal, message or data packet that is directed to an individual wireless speaker subsystem for applying an operational change to that particular wireless speaker subsystem. In some embodiments a single device control signal is concurrently provided to a plurality of individual wireless speaker subsystems, such as by way of message broadcast.

In the present embodiment, one of the wireless speaker subsystems is responsible for implementing sub-processes 103 to 105. That is, one of the wireless speaker subsystems defines the group representative of the wireless audio system, provides the system control interface, and is responsive to system control signals for implementing the desired operational changes across the system. Achieving this includes the step of identifying among the wireless speaker subsystems a wireless speaker subsystem, also called a leader wireless speaker subsystem. More specifically, in the present embodiment between sub-processes 101 and 103 there is an arbitration sub-process 102 where each speaker subsystem autonomously decides whether it is to be the leader speaker subsystem based on a predefined comparison protocol. In one embodiment this is performed on the basis that all speaker subsystems on the network are aware of each other.

Various comparison protocols are used among embodiments. For example, in some embodiments each speaker subsystem includes a unique hierarchical identifier, and periodically broadcasts this identifier for reception by other speaker subsystems. In this way each speaker subsystem is able to compile a list of speaker subsystems on the network and their corresponding hierarchical identifiers, and as such make an autonomous decision as to whether or not it is to become the leader. Some further comparison protocols used in other embodiments are discussed further below.

Wireless speaker subsystems that do not determine that they are leader wireless speaker subsystems inherently become slave wireless speaker subsystems, also called member wireless speaker subsystems, and as such do not implement sub-processes 103 to 105. As new wireless speaker subsystems connect to or otherwise appear on the network they scan the network for existing devices, and under certain conditions join existing wireless audio systems. Where a wireless speaker subsystem is not a leader wireless speaker subsystem, that wireless speaker subsystem implements a join sub-process in 106 to confirm its place in a wireless audio system. Join sub-process 106 is not shown in FIG. 1 for the sake of simplicity, however it will be appreciated that it is performed following sub-process 102 by a wireless speaker subsystem that determines itself not to be a leader wireless speaker subsystem. An example of sub-process 106 is found in FIG. 8.

Figure 2:
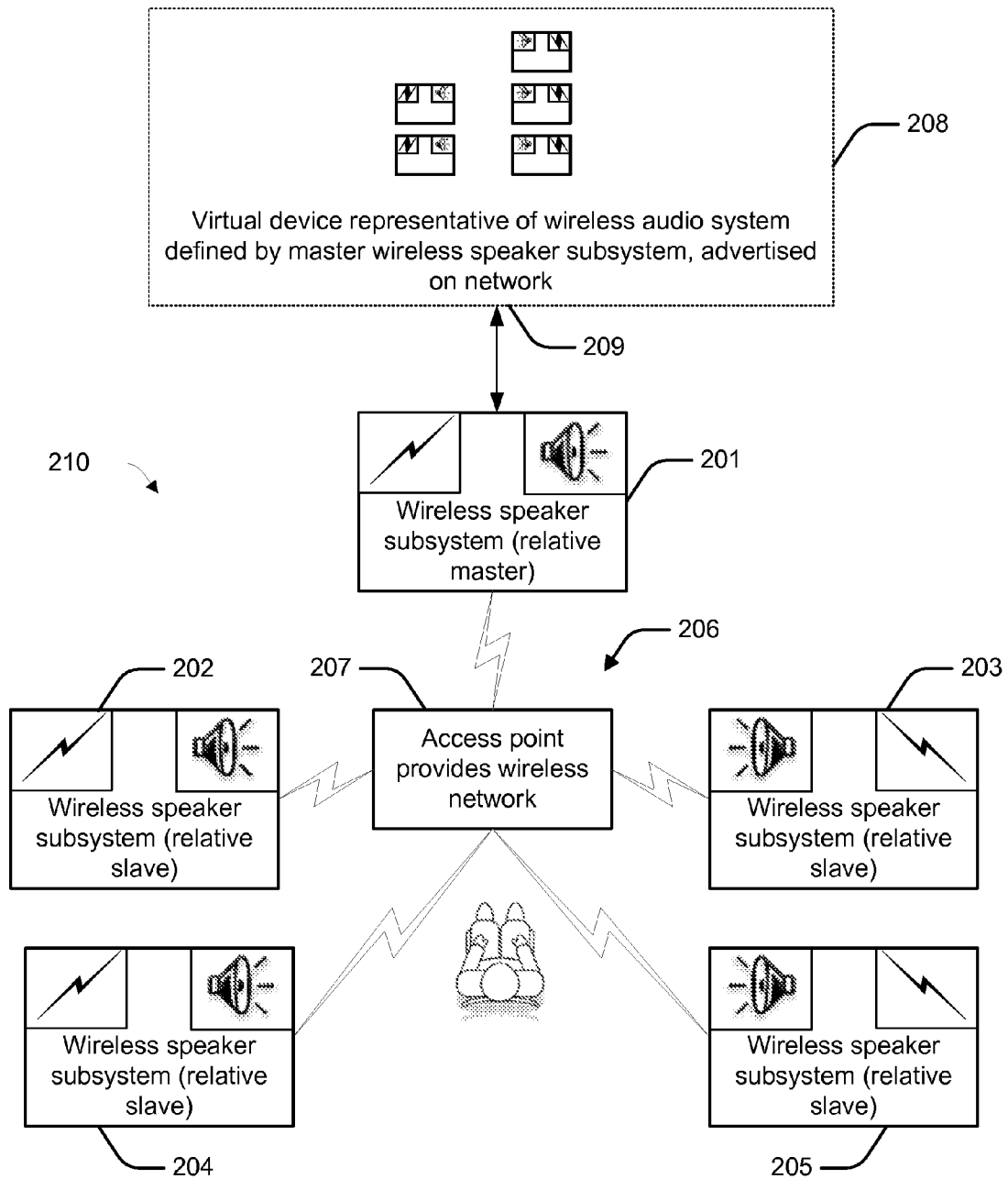
FIG. 2 schematically illustrates a wireless audio system embodiment including a plurality of wireless speaker subsystems.

FIG. 2 shows a wireless audio configuration including five wireless speaker subsystems 201 to 205. These wireless speaker subsystems are activated and automatically connect to a wireless network 206. Network 206 is provided by an open access point 207, and in connecting to network 206 each of the wireless speaker subsystems associate to access point 207. Access point 207 is "open" in the sense that wireless speaker subsystems 201 to 205 are able to associate without the need to grant in advance special permissions. In some embodiments such permissions are required. A method in line with that disclosed in FIG. 1 is carried out to provide a wireless audio system 210 including wireless speaker subsystems 201 to 205. In particular, a group 208 is defined, this device being representative of wireless audio system 210. Group 208 provides a system control interface 209 which receives system control signals for implementing operations changes across system 210.

From a terminology point of view, group 208 describes a discoverable group on network 206 that provides a capability in the form of a wireless audio system. System 201 describes the hardware making up the wireless audio system—including individual wireless speaker subsystems 201 to 205.

Although in FIG. 2 group 208 is shown as being separate from the leader wireless speaker subsystem, it will be appreciated that in a practical sense the group exists within and shares the hardware of the leader wireless speaker subsystem. Whilst messages are sent directly to the group, in a physical sense those messages are received by the network interface of the leader wireless speaker subsystem. This network interface may be a physical device such as a network interface, or alternately a logical interface.

Wireless speaker subsystems 201 to 205 have not been pre-configured to act as a group. They are off-the-shelf wireless speaker subsystems that, as discussed below, implement instructions to substantially autonomously arrange themselves to provide a wireless audio system such as system 210.

In the present embodiment wireless speaker subsystems 201 to 205 are provided by a single manufacturer, and as such implement generally the same protocols and procedures. They are of the same or a similar model—similar in that they may differ in details such as color, appearance, in size or speaker cone configuration. Each wireless speaker subsystem is uniquely identifiable electronically by one or more respective identifying features, such as unique MAC addresses. In other embodiments several different makes of wireless speaker subsystem are used.

Once activated, wireless speaker subsystems 201 to 205 undergo a discovery process in sub-process 101. There are a number of known discovery protocols that manage precisely how discovery takes place. In various embodiments of this invention discovery protocols such as Universal Plug and Play (UPnP) Bonjour and Jini are used, as well as proprietary discovery protocols. Bonjour is a general method to discover services on a local area network, and was formerly called Rendezvous. It is Apple's trade name for its implementation of the Zeroconf specification framework. For Jini, see www.jini.org.

Figure 3:
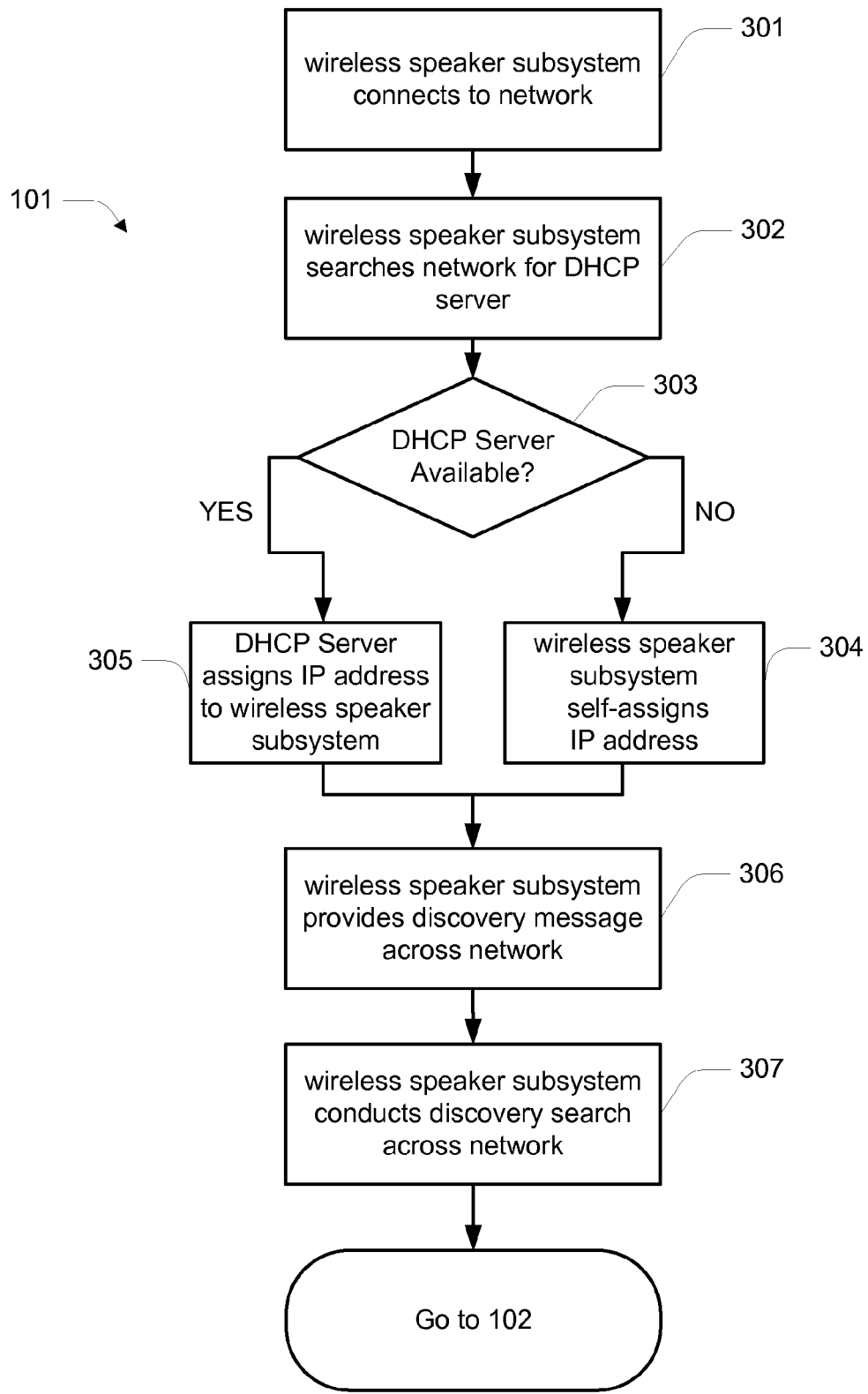
FIG. 3 shows a flowchart of an embodiment of a method performed by a wireless speaker subsystem.

The discovery process used in the present embodiment is shown in FIG. 3, and described below by reference to wireless speaker subsystem 201. It will be appreciated that this is provided as an example only, and in other embodiments other discovery processes are used.

Wireless speaker subsystem 201 connects to network 206 at step 301 in sub-process 101. Wireless speaker subsystem 201 implements Dynamic Host Configuration Protocol (DHCP) client, which searches for a DHCP server at step 302. Such a server is generally responsible for the assignment of IP addresses across a network, such as network 206. If, at decision 303, no DHCP server is available, wireless speaker subsystem 201 self-assigns an IP address at step 304. Otherwise, an available DHCP server assigns an IP address to wireless speaker subsystem 201 at step 305. In either case, the IP address assigned is used by wireless speaker subsystem 201 in subsequent network operations.

Once an IP address is assigned, the wireless speaker subsystem 201 advertises itself across network 206 at step 306. In particular, wireless speaker subsystem 201 provides a discovery message that communicates to wireless speaker subsystems 202 to 205 and other devices on network 206 a relatively small data packet indicative of wireless speaker subsystem 201. For example: data indicative of a type or identifier, and a URL indicative of a location from which more detailed information is available. In the present embodiment the data packet includes the wireless speaker subsystem's MAC address.

Although the present embodiment is described by reference to the use of IP addresses, that should not be regarded as limiting. For example, in one embodiment layer two encapsulated packets are used, optionally in conjunction with a proprietary discovery protocol adapted to make use of such packets. In one such embodiment only MAC layer access is required, as opposed to higher layer access such as IP layer access.

Step 307 includes conducting a discovery search across network 206 for devices of interest—such as other wireless speaker subsystems or groups representative of wireless audio systems. The discovery search includes the provision of a probe frame, and in response to this probe frame a similar discovery message to that mentioned above is provided by each complementarily discoverable device on network 206 to wireless speaker subsystem 201. This includes wireless speaker subsystems 202 to 206.

It will be appreciated that, following this discovery process, each wireless speaker subsystem 201 to 205 discovers the other wireless speaker subsystems regardless of the order in which the wireless speaker subsystems connect to network 206. For instance, the first wireless speaker subsystem to connect discovers the other wireless speaker subsystems as they connect and advertise themselves. The last wireless speaker subsystem to connect discovers the other wireless speaker subsystems following a discovery search.

This completes sub-process 101. In the present embodiment each wireless speaker subsystem waits for a predetermined time before progressing to the arbitration sub-process 102. In one embodiment this predetermined time is ten seconds without discovery of a wireless speaker subsystem. That is, if a given wireless speaker subsystem is idle for ten seconds without discovering another wireless speaker subsystem, that wireless speaker subsystem progresses to the arbitration sub-process. In other embodiments alternate time periods are used. In some embodiments alternate rules determine when a wireless speaker subsystem progresses to the arbitration sub-process.

Figure 4:
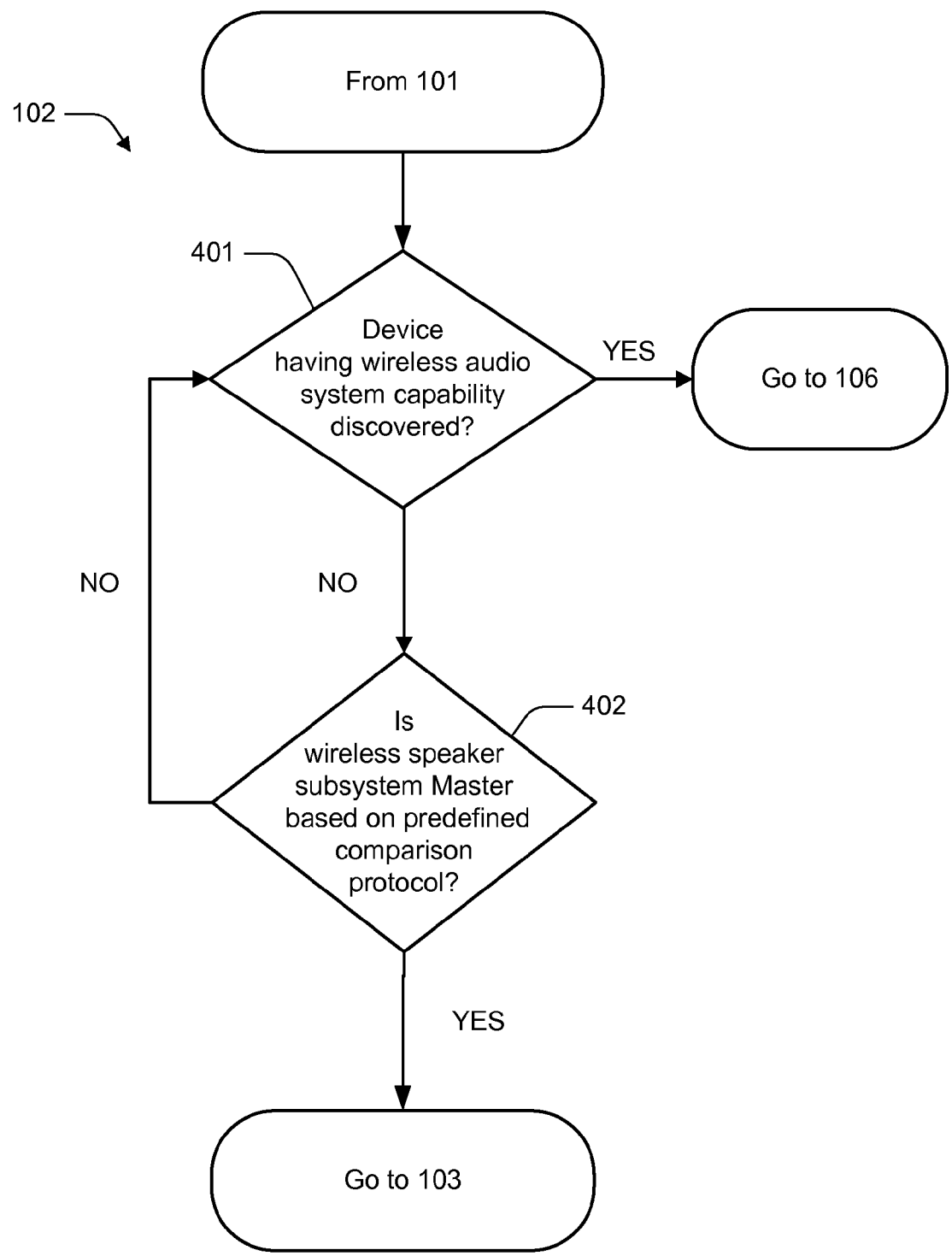
FIG. 4 shows a flowchart of an embodiment of a further method performed by a wireless speaker subsystem.

FIG. 4 shows the arbitration sub-process 102 of the present embodiment. Sub-process 102 commences at decision 401 where wireless speaker subsystem 201 decides whether an existing device having a wireless audio system capability has been discovered. For example, whether an existing group 208 has been discovered. If one has been discovered, the method progresses to sub-process 106. Otherwise the method progresses to decision 402.

At decision 402 wireless speaker subsystem 201 determines whether it is the leader device. As foreshadowed, in this sub-process each wireless speaker subsystem inherently adopts a leader or member role. In the present embodiment, use is made of device MAC addresses, and as foreshadowed MAC addresses are shared during the discovery sub-process. The MAC address for each wireless speaker subsystem is embedded with a hierarchical identifier, such as the numerical value of the final bit in the address. In overview, the wireless speaker subsystems inherently self assign leader and member roles based on comparison protocol that takes into account a comparison of these identifiers. In some embodiments other factors are also used in addition. Given the relative nature of the present comparison protocol, in one implementation a particular wireless speaker subsystem might be leader whilst in another implementation that same wireless speaker subsystem might be a member.

The use of MAC addresses for leader/member assignment should not be regarded as limiting. In other embodiments alternate approaches or combinations of approaches are adopted. Some alternate approaches include, for example:

Assessment of physical factors. For example, in a system having a first wireless speaker subsystem having an input for receiving a SPDIF signal and a second wireless speaker subsystem that does not accept SPDIF signal, the first wireless speaker subsystem can be inherently designed to act as a leader.

The use of a unique hierarchy identifier as part of a discovery message. That is, a wireless speaker subsystem advertises itself in a manner indicative of a hierarchy identifier, and another wireless speaker subsystem recognizes that device as a relative leader or member based on a comparison of the discovered device's hierarchy identifier and its own hierarchy identifier. This is similar to the MAC address approach, but uses another number which may or may not be pre-existing for other networking purposes.

A connection time based protocol where the time at which a wireless speaker subsystem associated to access point 207 determines whether it is the leader. For example, the leader is in one embodiment the first wireless speaker subsystem to associate to access point 207.

If, based on an assessment of the MAC addresses of discovered wireless speaker subsystems, wireless speaker subsystem 201 determines that it is the leader, the method progresses to sub-process 103. Otherwise the method loops to decision 401, and it will be appreciated that this repeats until a group 208 is found. In some embodiments a timeout function is implemented to contain such looping with predefined restraints.

Figure 5:
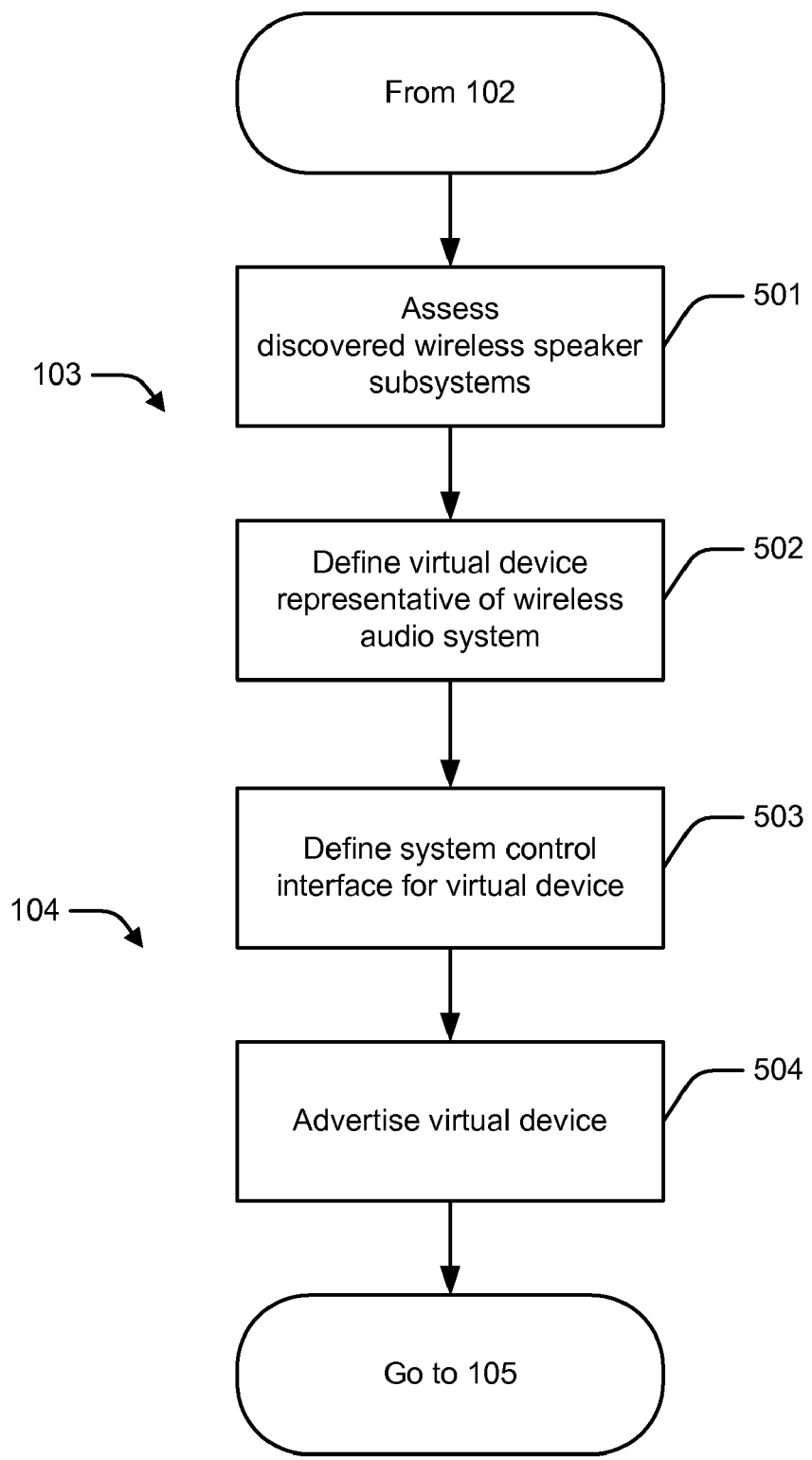
FIG. 5 shows a flowchart of an embodiment of a further method performed by a wireless speaker subsystem.

Sub-processes 103 and 104 of the present embodiment are shown in FIG. 5. As noted above, these sub-processes are only carried out by wireless speaker subsystem 201 where that wireless speaker subsystem determines it is the leader wireless speaker subsystem. At step 501 wireless speaker subsystem 201 assesses the wireless speaker subsystems that have been discovered—specifically wireless speaker subsystems 202 to 205—in terms of type and number. In some embodiments each wireless speaker subsystem is indicative of a location in a surround sound configuration, such as a "front-left" wireless speaker subsystem. In one embodiment each wireless speaker subsystem includes a physical or digital switch that is progressed between a plurality of positions to allow such identification. Based on the assessment at step 501, wireless speaker subsystem 201 defines group 208 at step 502. This definition step includes providing a discoverable description indicative of system 210, and assigning an IP address to device 208. For example, in the present embodiment the description might be of a "five wireless speaker subsystem wireless audio system". In embodiments where surround sound is enabled the description might be of a "five channel surround wireless audio system". This description is in some embodiments modified over time as a result of changes in hardware, such as the addition or removal of wireless speaker subsystems, or as a result of user interaction.

Sub-process 104 commences at step 503 with the definition of interface 209. This is in one embodiment performed based on instructions contained in the memory unit of wireless speaker subsystem 201. That is, wireless speaker subsystem 201 contains instructions indicative of how to define interface 209 based on the wireless speaker subsystems discovered. At step 504 interface 209 is provided, which includes making the interface available on network 206. In the present embodiment this in turn includes advertising device 208. As such, a user or other device on network 206 is able to discover device 208 and by way of interface 209 take control of system 210.

In the present embodiment group 208 is advertised in accordance with the UPnP open networking protocol. As part of this, device 208 provides some additional information itself. Specifically, group 208 provides in its discovery messages URLs to allow access to this additional information. The additional information for each device includes a UPnP description expressed in XML. This description includes a wide range of information, such as:

The availability of a wireless audio system capability, along with the number of wireless speaker subsystems and so on.

Details regarding how to take control of the wireless audio system capability. For example: command formats, how the system responds, parameters, variables rules and so on. Generally speaking, whatever information is required to allow a control unit to actually take meaningful control.

A control URL for the system control interface. A system control signal is in some embodiments provided to the control URL to make an operational change to the wireless audio system.

In some cases information can be provided by URL link within the XML description, as opposed to being entirely contained within the description.

In the present embodiment interface 209 is accessible as a graphical user interface via a personal computer on network 206 through a web browser and/or a standalone program executable on a client terminal. A user of the personal computer is able to make complex changes to group 208 in this way—for example configuring surround sound, removing wireless speaker subsystems, setting up groups composed of one or more physical wireless speaker subsystems, zones composed of groups, which are in turn composed of physical wireless speaker sybsystems, and so on.

Figure 6:
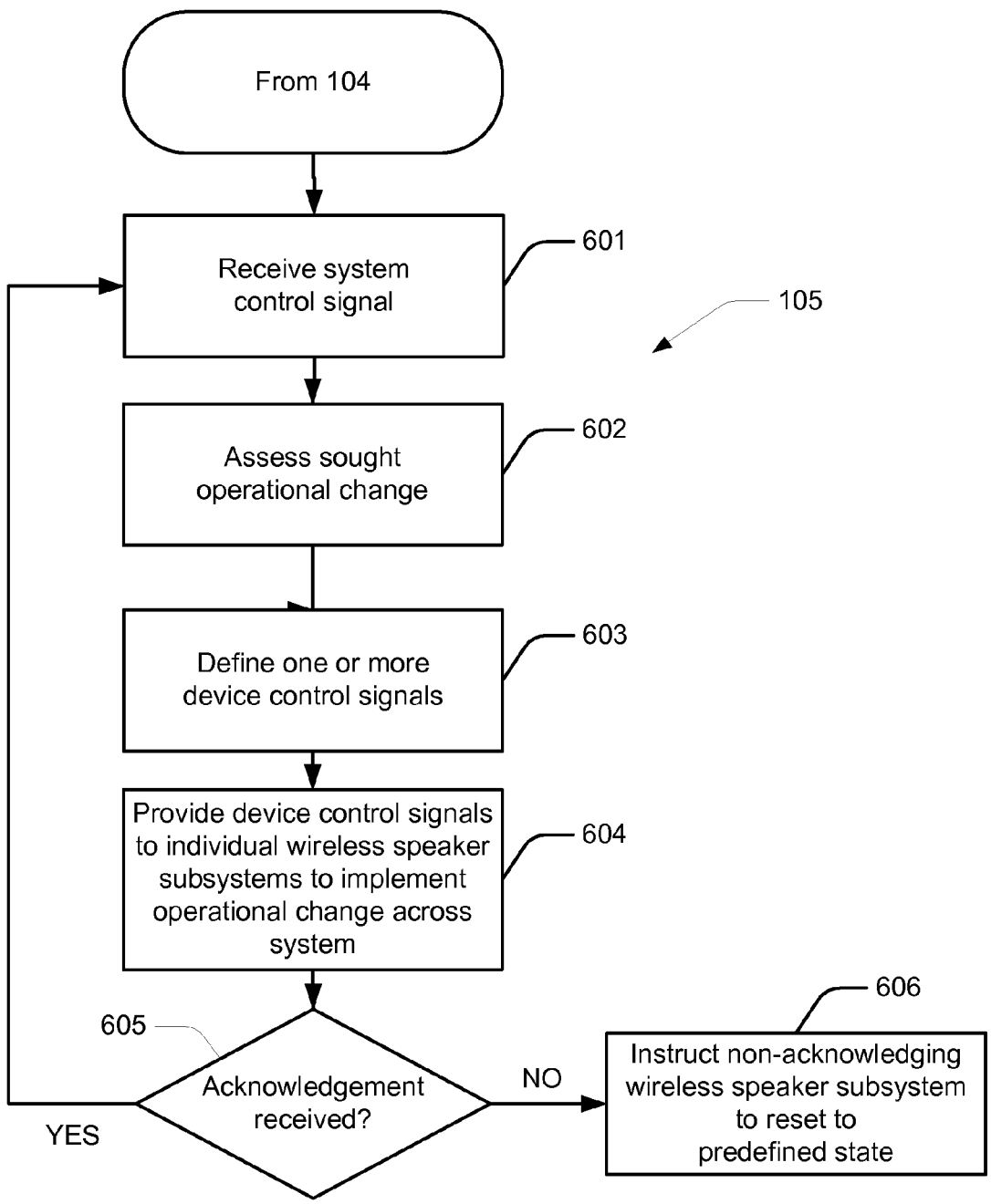
FIG. 6 shows a flowchart of an embodiment of a further method performed by a wireless speaker subsystem.

FIG. 6 illustrates sub-process 105 in greater detail, again in the context of wireless speaker subsystem 201. This assumes that wireless speaker subsystem 201 is the leader wireless speaker subsystem, and that sub-processes 103 and 104 have completed. Sub-process 105 commences at step 601 with the receipt of a system control signal by system control interface 209. Interface 209 (in physical terms wireless speaker subsystem 201) is enabled to be responsive to the system control signals for assessing the sought operational change at step 602 and defining one or more corresponding device control signals at 603. In one embodiment the interface 209 receives commands in the same format each of wireless speaker subsystems 201 to 205 would individually receive control signals, and as such device control signals are the same as the system control signals. In other embodiments the system control signals are different to the device control signals.

Device control signals are provided by interface 209 to each of wireless speaker subsystems 201 to 206 to implement the operational change across those wireless speaker subsystems at step 604. In the present embodiment this is performed using a custom network protocol based on a one way UDP broadcast message over IP from the leader wireless speaker subsystem (wireless speaker subsystem 201), coupled with a reliable TCP acknowledgement back to the leader from every other wireless speaker subsystem in system 210. This combination enables control signals to be received in a timely manner by all wireless speaker subsystems at a similar time, and also provides an asynchronous fail safe for wireless speaker subsystems that may not have received the message. At decision 605 interface 209 determines whether acknowledgements have been received from each wireless speaker subsystem within a predetermined time period. If all acknowledgements are received, the method progresses to step 601. Otherwise, if a wireless speaker subsystem fails to acknowledge a control message within a given time, interface 209 will, via a TCP message, instruct the failing wireless speaker subsystem to reset itself to a predefined state and progress to sub-process 106. This message is provided at step 606.

In another embodiment device control signals are unicast to the individual wireless speaker subsystems, as opposed to using a one way UDP broadcast message. This alternate approach better provides for individual control of the wireless speaker subsystems.

In some embodiments a device control signal includes data indicative of an execution time. For example, a device control signal is indicative of "apply operational change X at time Y". This allows for synchronisation of command execution such that, in the example of volume control, the wireless speaker subsystems each alter their volume at the same time. It will be appreciated that achieving such synchronisation in some embodiments requires for synchronisation of internal clocks in the individual wireless speaker subsystems. In one embodiment such synchronisation of internal clocks is carried out for the related purpose of ensuring synchronised media playback. In some embodiments the execution time is expressed as an offset of a known time.

Figure 7:
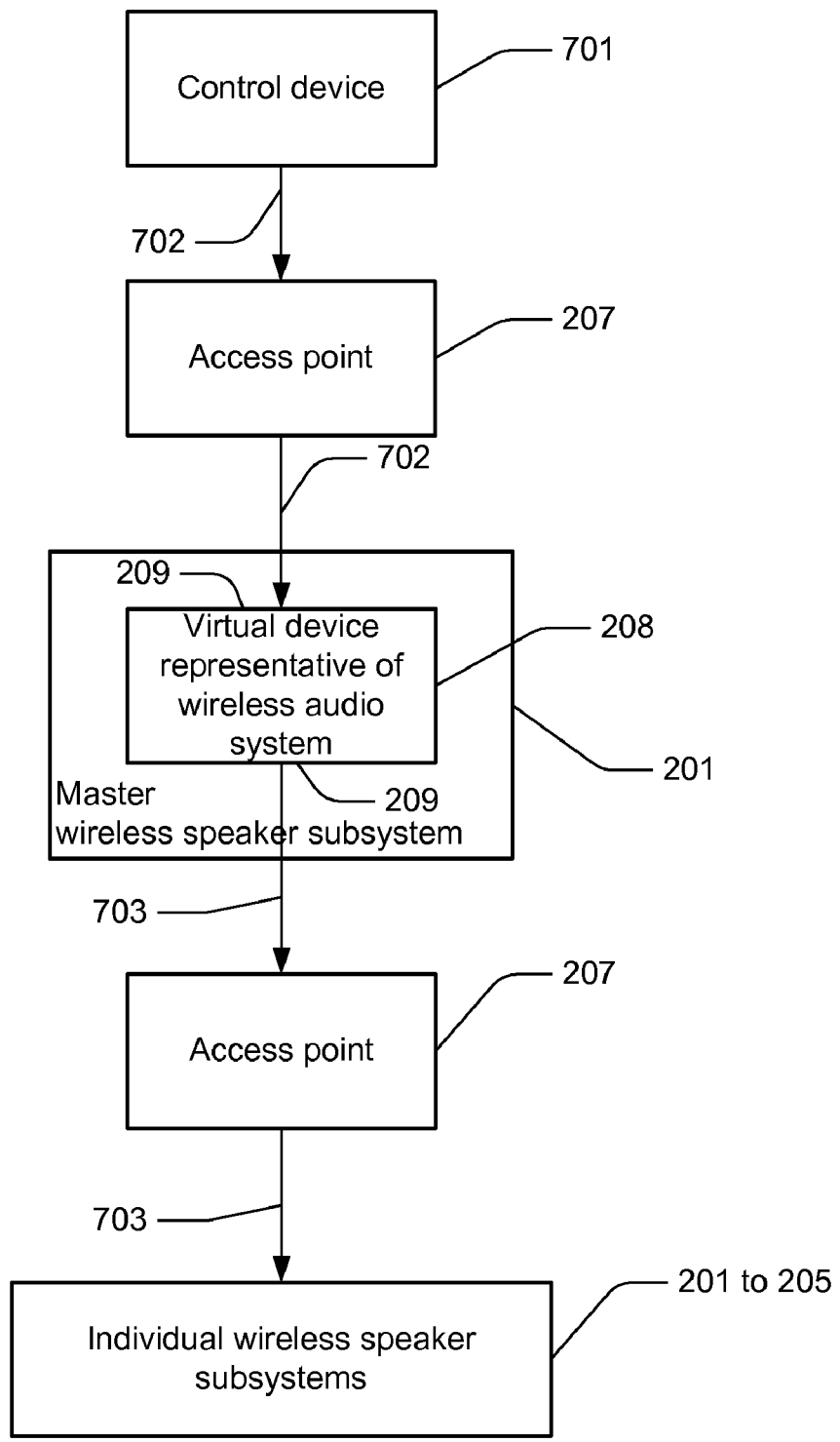
FIG. 7 schematically illustrates data flow in a wireless audio system according to one or more aspects of the present invention.

FIG. 7 schematically illustrates data flow during sub-process 105, and the numerical conventions of FIG. 2 are adopted. In overview, a control device 701 provides a system control signal 702, and subsequently corresponding device control signals 703 are received by wireless speaker subsystems 201 to 205.

It will be appreciated that the above approach involves some redundancy in the sense that interface 209 provides signals to wireless speaker subsystem 201 over network 206 irrespective of the fact that interface 209 is provided by wireless speaker subsystem 201. This redundancy balances with simplicity. In other embodiments wireless speaker subsystem 201 implements the operational change without the need for a device control signal to be sent from device 208 to wireless speaker subsystem 201.

There are two general categories of operational changes that affect system 210. The first of these is a global change that affects every wireless speaker subsystem in the same way. For example: a global increase in volume. In such a case the system control signal is the same as the device control signals, and effectively wireless speaker subsystem 201 is simply responsible for distributing the system control signal as a device control signal to each of the wireless speaker subsystems. The second category is a complex change that affects different wireless speaker subsystems in a different way. For example: where system 210 has been configured to provide a five-channel surround sound configuration, and the operational change affects only a selection of the wireless speaker subsystems. In one example a system control signal is provided to reduce the volume on the front left wireless speaker subsystem, which in this embodiment is wireless speaker subsystem 202. In such a case wireless speaker subsystem 201 is responsible for assessing the system control signal, and defining device specific device control signals. In the present example a single device control signal is defined, this signal being uniquely intended for and provided to wireless speaker subsystem 202, instructing wireless speaker subsystem 202 to reduce its output volume.

It will be appreciated that configuring wireless speaker subsystems 201 to 206 to adopt roles in a complex configuration may involve additional steps and manual intervention. For example, if a 5-channel surround system is desired, it is necessary to identify which wireless speaker subsystem is physically located in which position. Device 208 in some embodiments provides a user interface accessible via a personal computer to assist in such a task.

It is worth noting that the ability of wireless speaker subsystem 201 to control wireless speaker subsystems 202 to 206 hinges on wireless speaker subsystem 201 being privy to information detailing the manner in which those wireless speaker subsystems are controlled. This information is in some embodiments maintained by wireless speaker subsystem 201, or in other embodiments obtained during the discovery sub-process, or in other embodiments even obtained from a remote data source such as the Internet when required. Assuming such information can be obtained, wireless speaker subsystem 201 is able to provide a wireless audio system including wireless speaker subsystems from alternate manufactures. For example, wireless speaker subsystem 201 is able to include substantially any UPnP wireless speaker subsystem in a wireless audio system.

Effectively, wireless speaker subsystem 201 provides by way of device 208 and interface 209 a centralized location for receiving system control signals that effect system 210 as a whole. For example, if there is a desire to increase the volume on all of wireless speaker subsystems 201 to 205, a signal indicative of that operational change is provided to device 208. This circumvents the need for a user to manually provide a signal to each individual wireless speaker subsystem.

In some embodiments device 208 is responsive to the discovery of other controllable devices on network 206 for selectively defining additional groups. For example, a particular wireless speaker subsystem may provide a microphone input, allowing a virtual hands-free telephone device to be created. Group logic maintained on wireless speaker subsystem 101 is able to interrogate devices on the network, determine their capabilities and present a list of possible groups to create given the resources available.

Figure 8:
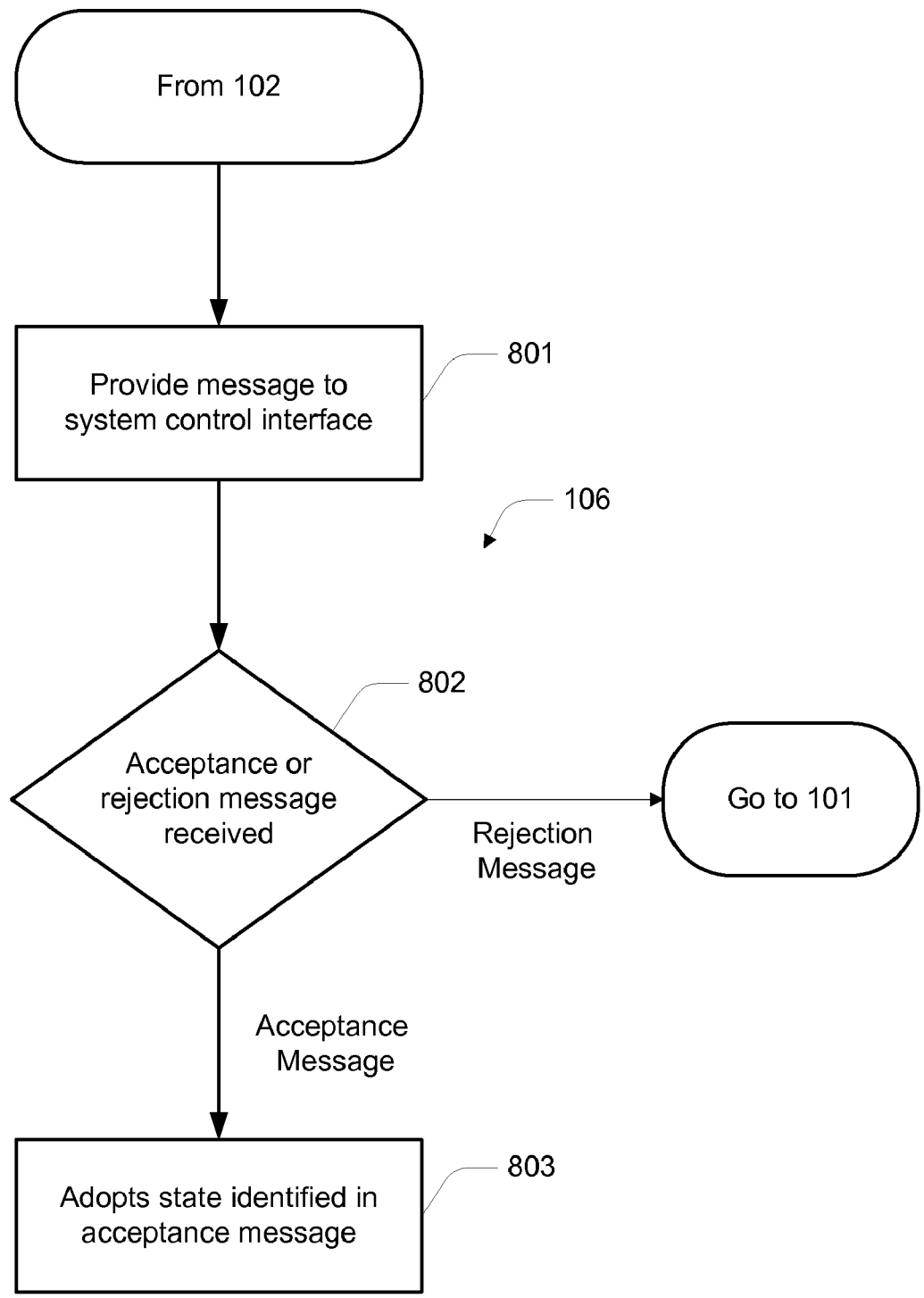
FIG. 8 shows a flowchart of an embodiment of a further method performed by a wireless speaker subsystem.

FIG. 8 illustrates sub-process 106 in greater detail. Given that the above disclosure describes sub-processes 103 to 105 in terms of wireless speaker subsystem 201, this sub-process is described by reference to wireless speaker subsystem 202—which determines during sub-process 102 that it is not the leader. At step 801 wireless speaker subsystem 202 provides a message to interface 209 indicative of its willingness to participate in system 210. Interface 209 is responsive to such as message for providing an acceptance or rejection, and this is received at decision 802. In one instance, in the case of rejection, wireless speaker subsystem 202 may return to sub-process 101 to ensure a consistent system state. In the case of acceptance, the acceptance message is indicative of an operational state provided by device 208 that should be adopted by wireless speaker subsystem 202. The rationale is for device 208 to know the state of each wireless speaker subsystem in system 210. In some embodiments device 208 periodically interrogates each wireless speaker subsystem to obtain data indicative of their respective operative states. At step 803 wireless speaker subsystem 202 adopts the state identified by the acceptance message, and provides a TCP acknowledgement to device 208.

In some embodiments a group which references other groups may be created. A set of groups may be referred to as a zone while a set of physical devices could be referred to as a group. A zone would be created to address the need for multi-room media playback where multiple groups would be required to act on identical media and commonly process commands relating to media playback. A group composed of groups would address the same issues of command and media stream routing between groups as would be required in an embodiment where a group routes commands to physical devices.

Figure 9:
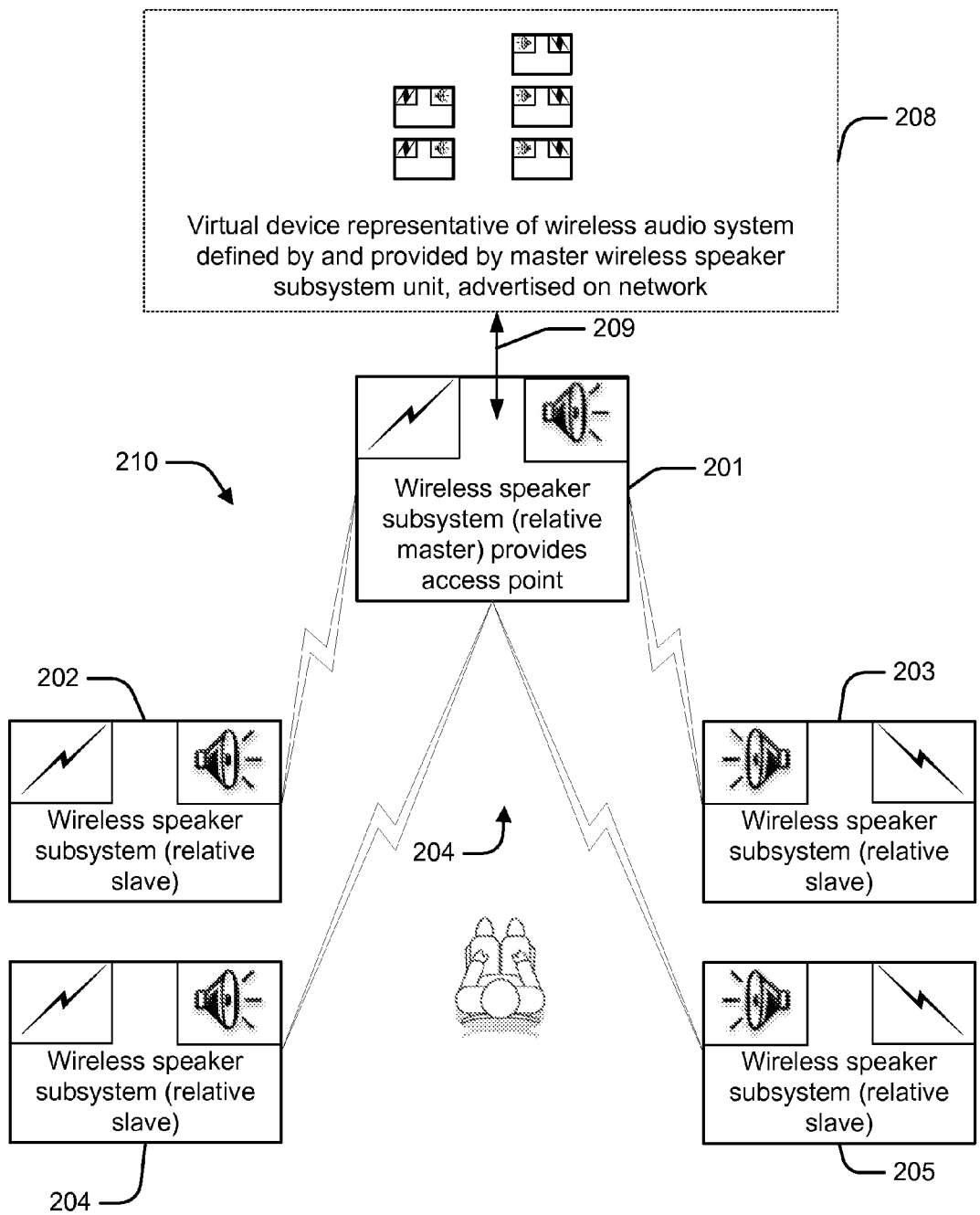
FIG. 9 schematically illustrates a wireless audio system embodiment including a plurality of wireless speaker subsystems.

As noted above, in the embodiment of FIG. 2 wireless speaker subsystems 201 to 205 associate to an existing access point 207. In some instances no access point is provided, and one of the wireless speaker subsystems inherently provides an access point. Such an embodiment is shown in FIG. 9, which adopts the same numbering conventions as FIG. 2. In this embodiment each wireless speaker subsystem scans for an available access point for a predetermined period of time, and if no beacon or probe response frames are received, establishes itself as an open access point. In a similar manner to the leader/member (master/slave) determination technique discussed above, MAC addresses are often used to assist this process. Specifically, in one embodiment, each wireless speaker subsystem scans for a period of time related to the final byte in its MAC address—in some embodiments between about five to ten seconds multiplied by the value of that final byte. If no access point is found within that time, the wireless speaker subsystem initiates its own open access point. It will be appreciated that by such an approach only one of the wireless speaker subsystems need initiate an access point, and the remaining wireless speaker subsystems will associate to that access point. In one embodiment the wireless speaker subsystem providing the access point becomes the leader device, reducing the complexity of sub-process 102.

In some embodiments the wireless speaker subsystems first associate to an open access point, and subsequently self arrange themselves into an internal private network.

Figure 10:
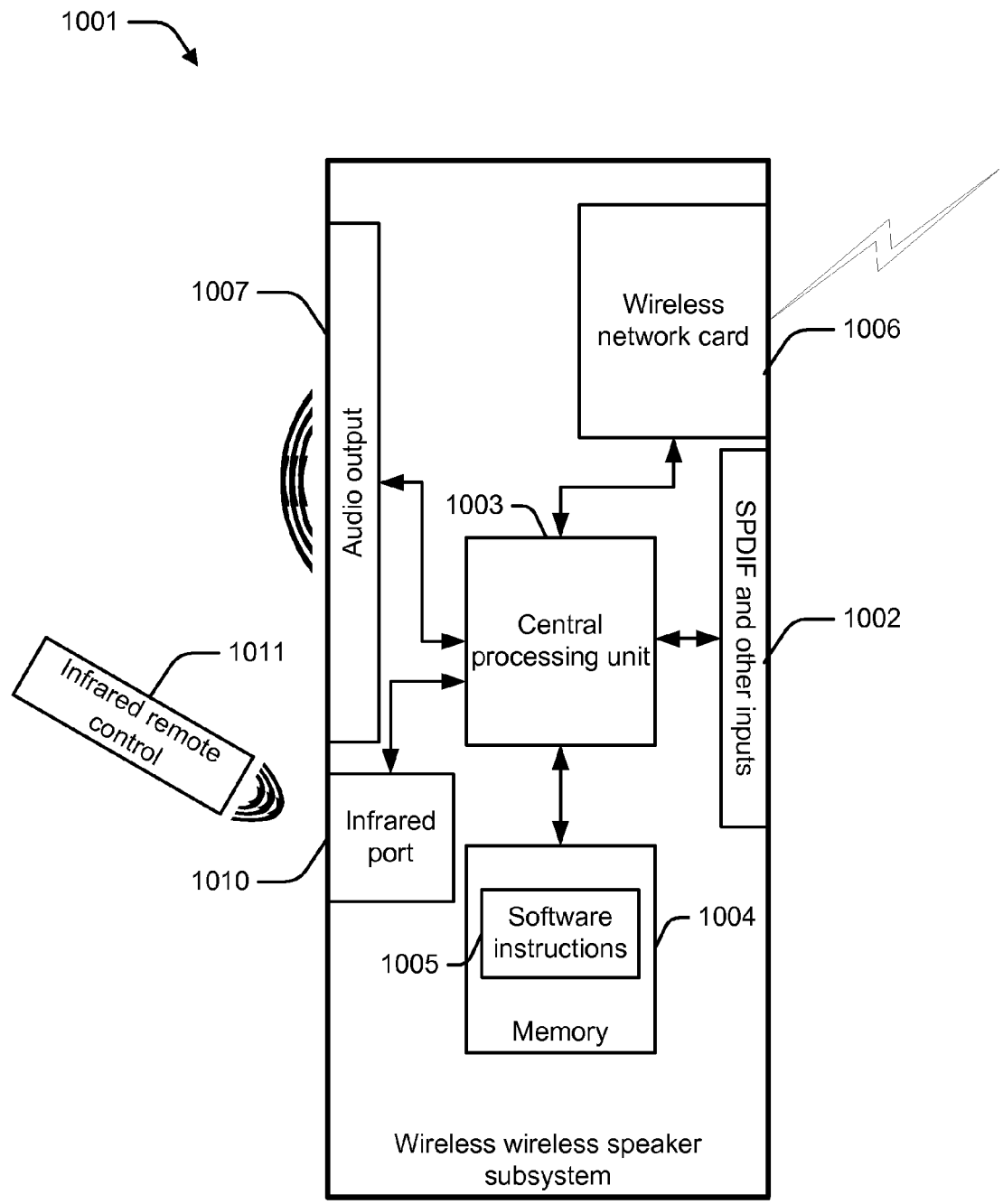
FIG. 10 schematically illustrates an embodiment of a wireless speaker subsystem.

FIG. 10 shows a wireless speaker subsystem 1001 in more detail. This wireless speaker subsystem is appropriate for use in the above embodiments. For example, in some embodiments wireless speaker subsystem 201 is interchangeable with wireless speaker subsystem 1001.

Wireless speaker subsystem 1001 includes an input array 1002 for receiving audio signals. Array 1002 includes a SPDIF input, along with various other standard and proprietary digital audio inputs. In some instances array 1002 includes one or more analogue audio inputs, in which case wireless speaker subsystem 1001 includes an analogue to digital converter for converting analogue audio signals into digital form. Once received (and where necessary digitized) the audio signals are processed by a processing unit, e.g., a central processing unit (CPU) 1003, which operates in conjunction with memory 1004. Memory 1004 includes software instructions 1005 which, among other functions, allow wireless speaker subsystem 1001 to perform methods described herein. It is noted that not all instructions required for performing these methods need be in memory 1004 at a given time.

Wireless speaker subsystem 1001, given that it presents the virtual interface for system 210, also becomes responsible for fetching media from a server, or in the case of an SPDIF stream, partially recovering that stream from a digital input. Data indicative of this media or stream is then distributed to the other devices in the group. CPU 1003 is responsible for administering playback of a received audio signal. In a broad sense, this includes two distinct tasks. Firstly, using a wireless network interface 1006, providing instructions to other wireless speaker subsystems to play respective components of the audio signal. Secondly, using an audio output 1007 (which in some embodiments includes one or more speaker cones), playing back the intended center wireless speaker subsystem component of the audio signal. There are, of course, detailed issues of rendering and synchronization, and these fall beyond the scope of the present disclosure.

Wireless speaker subsystem 1001 also includes an infrared port 1010. This infrared port receives infrared control signals from a compatible infrared remote controller 1011. Where wireless speaker subsystem 1001 acts as an individual wireless speaker subsystem, such a signal is a device control signal. However, when wireless speaker subsystem 1001 is part of a wireless audio system, such a signal is recognized as a system control signal. A system control signal received by infrared port 1010 is provided by a TCP message to the group. This is discussed further in by reference to FIG. 11 and FIG. 12.

In other embodiments alternate remote controls are used, such as Bluetooth remotes, 802.11 type networked remotes, and radio frequency remotes.

In other embodiments a control signal received by infrared port 1010 is provided to the group by means other than TCP message—for example by a layer two encapsulated message or other proprietary message.

Figure 11:
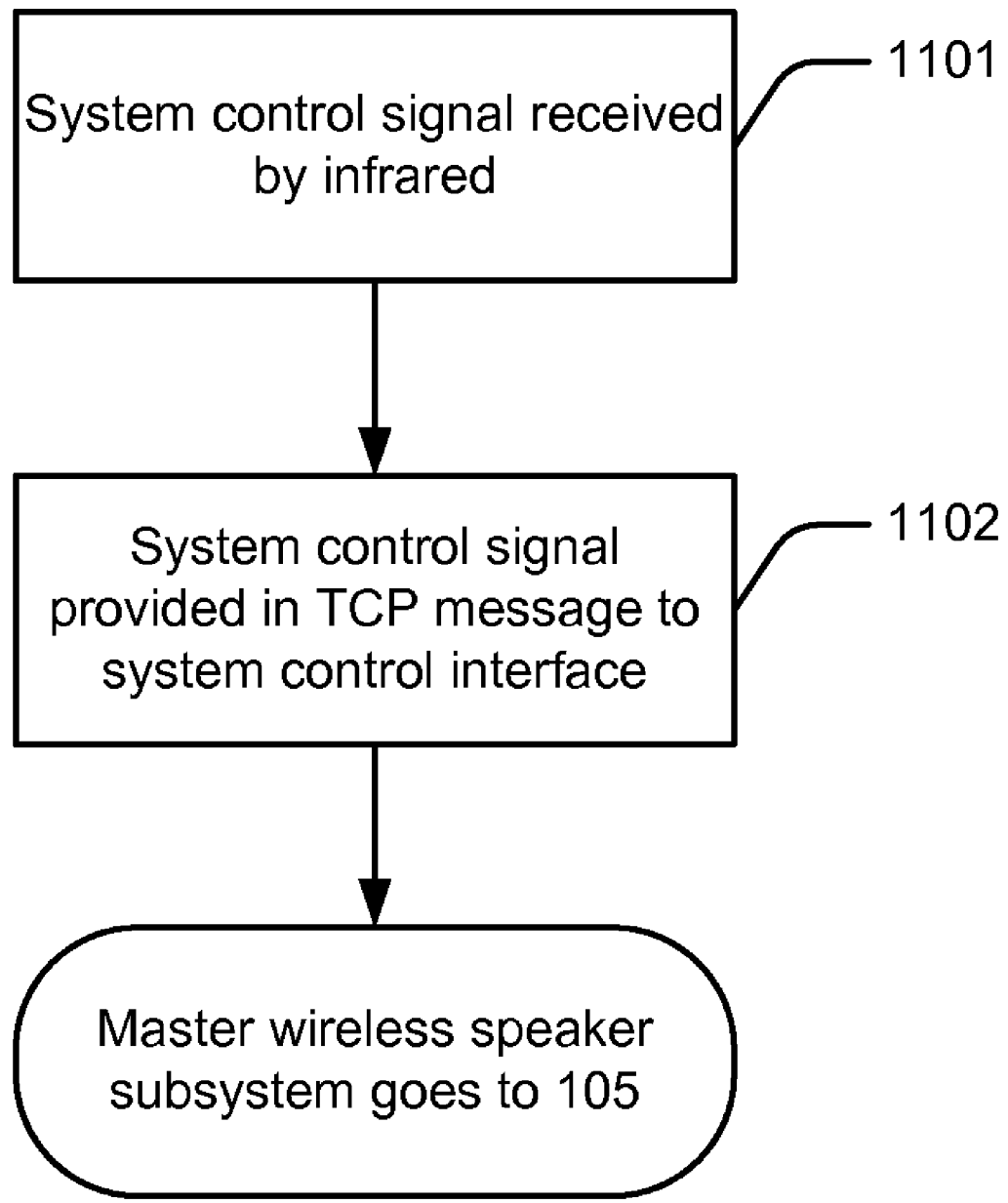
FIG. 11 shows a flowchart of an embodiment of a further method performed by a wireless speaker subsystem.

FIG. 11 shows a method for processing a system control signal received by infrared. This method is described by reference to the example of FIG. 2. The signal is received at step 1101, and provided in a TCP message to interface 209 of device 208 at step 1102. Device 208 then progresses to sub-process 105, and the relevant operational change is implemented across the system.

In overview, there are multiple one-way external interfaces that must propagate received commands to group 208. Because this is a unidirectional message, it is accomplished using a TCP connection from the wireless speaker subsystem receiving the infrared signal back to the group. Upon being received at the group, the received commands are aggregated to remove duplicate commands. Duplicates can occur because the same infrared command might be received concurrently at more than one infrared port. Obviously, though, only one action is desirable per button press on remote 1011. After aggregation then, the resulting single change in state is then distributed to all of the wireless speaker subsystems as discussed in relation to sub-process 105.

In one embodiment, messages provided at step 1102 are timestamped. In that embodiment, aggregating the received commands to remove duplicate commands includes analysis of these timestamps. In particular, when a command is received via infrared at step 1101, a timestamp is defined to identify the time at which the infrared command was received. The group, upon receipt of timestamped messages, compare the timestamps to determine whether received commands are unique or duplicates. In one embodiment the timestamp is a global timestamp derived from a global clock. In another embodiment the timestamp is derived from a device clock maintained by a particular wireless speaker subsystem, and all device clocks in the system are synchronised in accordance with a synchronisation protocol.

By this approach, a user can, by way of remote 1011, control system 210 by physically pointing the remote substantially in the direction of any of the wireless speaker subsystems and pressing one or more buttons enabled to cause operational changes.

Figure 12:
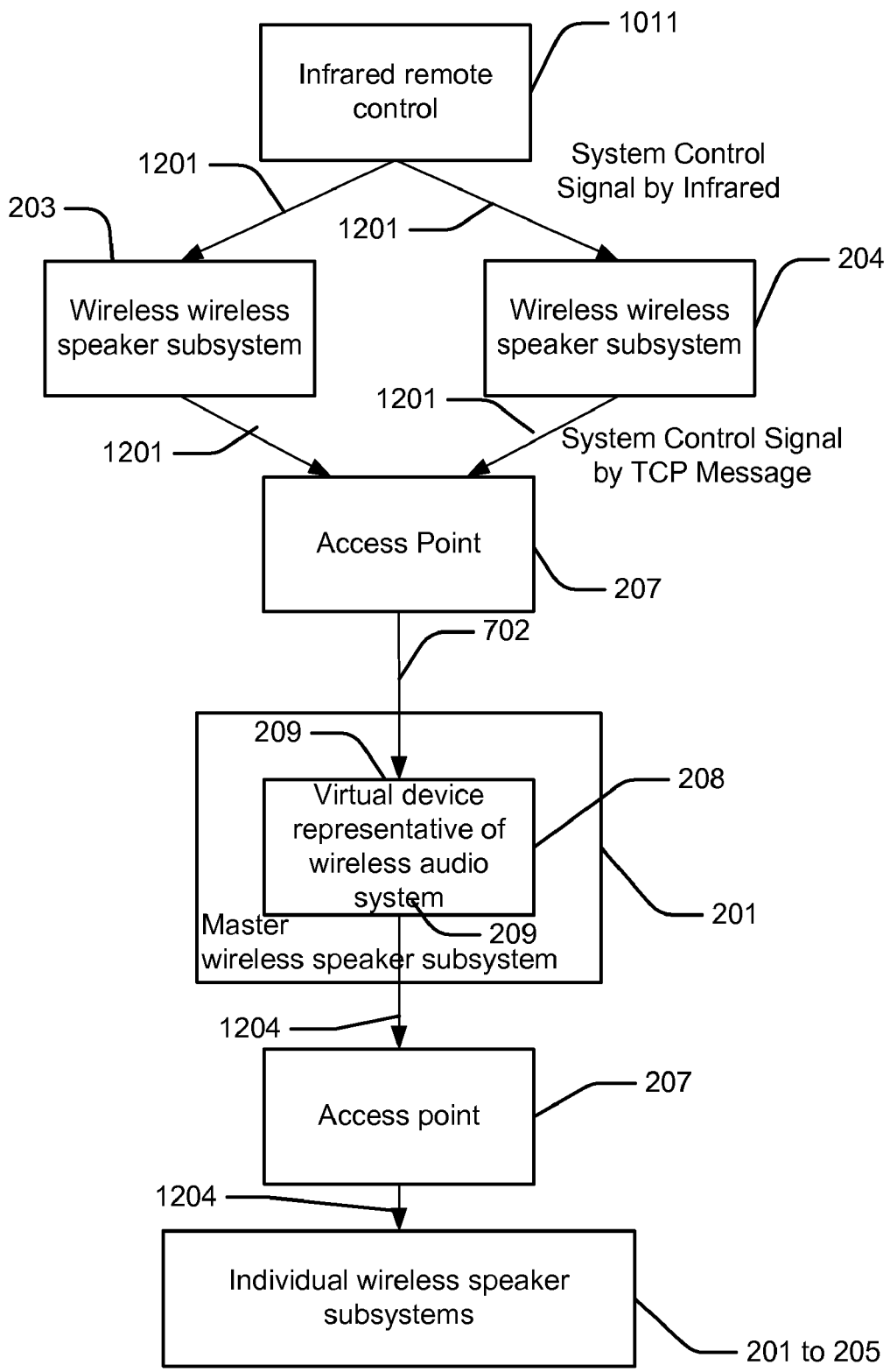
FIG. 12 schematically illustrates data flow in a wireless audio system embodiment.

FIG. 12 shows the data paths for infrared signals in a manner similar to the example of FIG. 7. In overview, remote 1011 provides a system control signal 1201, and this signal is received by to wireless speaker subsystems 203 and 204. These wireless speaker subsystems provide identical system control signals 1202 to device 208, and wireless speaker subsystems 201 to 205 subsequently receive corresponding device control signals 1204.

Similar infrared approaches are in some embodiments applied in situations where a group is not used. For example, where the leader wireless speaker subsystem advertises itself as a leader wireless speaker subsystem. In that case data indicative of the infrared signal is provided using a TCP connection from the wireless speaker subsystem receiving the infrared signal back to the leader wireless speaker subsystem.

Figure 13:
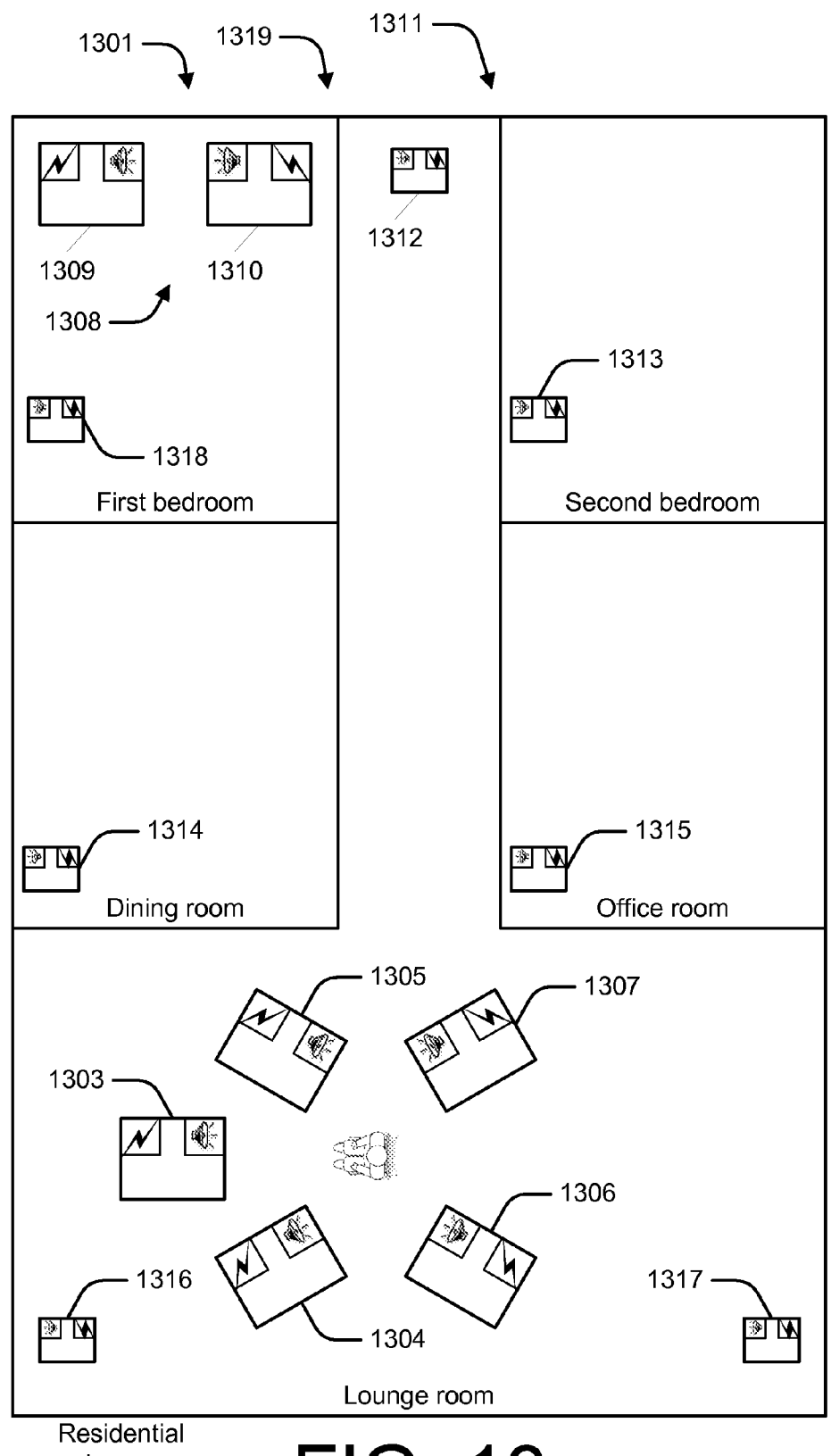
FIG. 13 is a plan view of a location having a plurality of wireless audio system embodiments.

In some embodiments multiple wireless audio systems are defined on a common network. For example, a building is split into areas where a different wireless audio system serves each area, although a single network serves all of the areas in combination. This is shown in the example of FIG. 13, which provides a plan view of a residential house 1301. There are three wireless audio systems defined:

Lounge DVD surround system 1302, including wireless speaker subsystems 1303 to 1307.

Bedroom stereo system 1308, including wireless speaker subsystems 1309 and 1310.

House ambiance system 1311, including wireless speaker subsystems 1312 to 1318.

House leader system 1319, including all of the above wireless speaker subsystems.

Where multiple systems exist on a common network, the groups representative of these systems determine which is to become the parent system (also referred to as the zone leader). This is largely dependent on the situation and the circumstances in which the systems were created. In some embodiments, one system is explicitly added to an existing system as a child system. In this case, system 1312 is the parent system and a group representing this system presents a system control interface for controlling all wireless speaker subsystems in the zone. This interface is used to apply an operational change across the whole zone—for example simultaneously muting all wireless speaker subsystems in the house. Each child system (systems 1302, 1308 and 1311) is represented by a respective group having its own control interface. To apply an operational change in a child system, a system control signal is provided to the group representative of that child system. To apply an operational change to the parent system, a system control signal is provided to the group representative of the parent system. In some embodiments the zones representative of all parent and child systems are provided by a common leader wireless speaker subsystem, regardless of whether that wireless speaker subsystem is included in each and every child system.

Although embodiments are described herein by reference to wireless speaker subsystems, it will be appreciated that in other embodiments other wireless media renderers are used. For example, wireless video units that receive over a wireless network data indicative of video and provide that video via a video output such as an LCD screen or an analogue or digital connection port.

Additionally, although the above embodiments have been described by reference to wireless networking, in some embodiments alternate networking arrangements are used such as wire-based Ethernet networks and power line networks. It will be appreciated that embodiments of the invention described by reference to wireless networking are equally applicable to these other networking arrangements.

It should be appreciated that although the invention has been described in the context of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable computer-readable medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable computer-readable medium encoded with computer-executable code.

Furthermore, a computer-readable computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable computer-readable medium encoded with a set of instructions, e.g., a computer program that are for execution on one or more processors, e.g., one or more processors that are part of a wireless speaker subsystem unit or other wireless media rendering device. Thus, as will be appreciated by those skilled in the art, embodiments of the present invention may be embodied as a method, an apparatus such as a special purpose apparatus, an apparatus such as a data processing system, or a computer-readable computer-readable medium, e.g., a computer program product. The computer-readable computer-readable medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of computer-readable medium (e.g., a computer program product on a computer-readable storage medium) encoded with computer-readable program code embodied in the medium.

The software may further be transmitted or received over a network via a network interface device. While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any tangible medium that is capable of storing, encoding or carrying a set of instructions for execution by one or more of the processors and that cause the one or more processors to perform any one or more of the methodologies of the present invention. A computer-readable medium may take many forms, including but not limited to, non-volatile media. Non-volatile media includes, for example, optical, magnetic disks, and magneto-optical disks. For example, the term "computer-readable medium" shall accordingly be taken to included, but not be limited to, solid-state memories, a computer product embodied in optical and magnetic media, a tangible medium bearing a propagated signal detectable by at least one processor of one or more processors and representing a set of instructions that when executed implement a method.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard, the invention is not limited to such contexts and may be utilized in various wireless and non-wireless network applications and systems.

In one embodiment the SPDIF enabled device becomes the leader. In some embodiments, the group and the media source will not be implicitly linked together, so it may be possible for one device to have the SPDIF input and another to provide the streaming source from SPDIF.

A networked digital media playback device may be connected through any form of computer network including networks with wired and wireless physical layers and networks consisting of multiple physical layers. The network through which the digital media playback device is connected does not affect the operation of the group other than to partially vary the extent to which synchronous playback is possible.

While in most of the description above, a set of wireless speakers is used as an example of a networked digital media player, the invention is not limited to wireless speakers. Those in the art would readily be able to modify the description provided herein for wireless speakers and apply the methods and apparatuses to other discrete media playback devices. Thus while in one embodiments, some of the media playback devices include a radio interface and the network includes a wireless network, in general, the invention is applicable to media playback devices that can connect to a computer network. The description is provided in terms of wireless speakers in order to keep the description simple and not obscure the inventive concepts.

Furthermore, in most of the description above, a wireless audio system is used as an example of a networked digital media playback system—i.e., as an example of a system that allows one or more devices connected via a computer network to render digital media, the invention is not limited to a wireless audio system. Those of ordinary skill in the art would readily be able to modify the description provided for wireless audio systems herein and apply the methods and apparatuses to other digital media playback systems. The description is provided in terms of wireless speakers and a wireless audio system in order to keep the description simple and not obscure the inventive concepts.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method for providing a multimedia system including a plurality of networked multimedia devices, the method including the steps of:
   discovering the plurality of devices on a computer network;
   defining at least two groups, each group being representative of a networked multimedia system including two or more devices;
   providing, for each group, a system control interface for receiving, from a control device, a system control signal indicative of an operational change to the group, wherein each group has a relative group leader configured to:
   (i) receive the system control signal; and
   (ii) in response to the system control signal, define respective corresponding device control signals, and provide those device control signals to the devices thereby to implement the operational change across the group;
   defining at least one zone, the zone being representative of a networked multimedia system including two or more groups;
   providing, for the zone, a system control interface for receiving, from a control device, a zone control signal indicative of an operational change to the zone, wherein the zone has a relative zone leader configured to:
   (i) receive the zone control signal; and (ii) in response to the zone control signal, define respective corresponding device control signals, and provide those device control signals to the devices thereby to implement the operational change across the zone.

2. A method as recited in claim 1 including the step of identifying among the devices a group leader device corresponding to the relative group leader for at least one of the at least two groups.

3. A method as recited in claim 2 wherein the leader device provides the system control interface.

4. A method as recited in claim 3 wherein the leader device is responsive to the system control signal for defining and providing the corresponding device control signals.

5. A method as recited in claim 2 wherein each device has a respective hierarchical identifier for facilitating the identification of the leader device.

6. A method as recited in claim 5 wherein the hierarchical identifiers are embedded in respective unique device identifiers.

7. A method as recited in claim 6 wherein the unique device identifiers are MAC addresses.

8. A method as recited in claim 1 wherein the devices each autonomously determine whether they are the group leader device.

9. A method as recited in claim 8 wherein the determination is based on a predefined comparison protocol.

10. A method as recited in claim 1 wherein providing the system control interface includes advertising each group on the network.

11. A method as recited in claim 1 wherein the system control interface is provided in accordance with an open networking protocol.

12. A method as recited in claim 1 wherein the device control signals are indicative of a change time at which the change is to be made such that the operational change is implemented across the group by the devices in synchronicity.

13. A method performed by a networked multimedia device for providing a multimedia system including the device and one or more complementary networked multimedia devices, the method including the steps of:
    connecting to a computer network;
    undergoing a discovery process on the computer network for allowing mutual discovery of the device, and the one or more complementary devices;
    determining whether the device is a group leader relative to the one or more complementary devices; and
    in the case that the device is the group leader:
    defining a group representative of the networked multimedia system including the device and the one or more complementary devices;
    providing, for the group, a system control interface for receiving, from a control device, a system control signal indicative of an operational change to the group;
    receiving the system control signal; and
    being responsive to the system control signal for defining respective corresponding device control signals and providing those device control signals to the devices thereby to implement the operational change across the group;
    determining whether the device is a zone leader relative to the one or more complementary devices and one or more further groups of complementary devices; and
    in the case that the device is the zone leader:
    defining a zone representative of a plurality of networked multimedia systems, wherein one of the networked multimedia systems includes the device and the one or more complementary devices, and wherein another of the networked multimedia systems includes a further set of complementary devices;
    providing, for the zone, a zone control interface for receiving, from a control device, a system control signal indicative of an operational change to the zone;
    receiving the zone control signal; and
    being responsive to the zone control signal for defining respective corresponding device control signals for the individual devices in the zone, and providing those device control signals to the devices thereby to implement the operational change across the zone.

14. A method as recited in claim 13 wherein implementing the operational change includes providing to the one or more complementary devices respective device control signals corresponding to the operational change.

15. A method as recited in claim 13 wherein the system control interface is provided in accordance with an open networking protocol.

16. A method as recited in claim 15 wherein the open networking protocol is Universal Plug and Play (UPnP).

17. A method as recited in any preceding claim, wherein at least some of the devices include a radio interface and wherein the network includes a wireless network.

18. A non-transitory computer-readable medium encoded with computer-executable instructions that when executed by one or more processors maintained by a networked multimedia device cause the multimedia device to carry out a method of providing a multimedia system including the device, and one or more complementary wireless multimedia devices the method comprising the steps of:
    connecting to a computer network;
    undergoing a discovery process on the computer network for allowing mutual discovery of the device, and the one or more complementary devices;
    determining whether the device is a group leader relative to the one or more complementary devices; and
    in the case the device is a group leader:
    defining a group representative of a networked multimedia system including the device and the one or more complementary devices;
    providing, for the group, system control interface for receiving, from a control device, a system control signal indicative of an operational change to the group;
    receiving the system control signal; and
    being responsive to the system control signal for defining respective corresponding device control signals and providing those signals to the devices to implement the operational change across the group;
    determining whether the device is a zone leader relative to the one or more complementary devices and one or more further groups of complementary devices; and
    in the case that the device is the zone leader:
    defining a zone representative of a plurality of networked multimedia systems, wherein one of the networked multimedia systems includes the device and the one or more complementary devices, and wherein another of the networked multimedia systems includes a further set of complementary devices;
    providing, for the zone, a zone control interface for receiving, from a control device, a system control signal indicative of an operational change to the zone;
    receiving the zone control signal; and
    being responsive to the zone control signal for defining respective corresponding device control signals for the individual devices in the zone, and providing those device control signals to the devices thereby to implement the operational change across the zone.

19. A non-transitory computer-readable medium encoded with a set of instructions that when executed by one or more processors cause the one or more processors to carry out a method for providing a multimedia system including two or more networked multimedia devices, the method including the steps of:
   discovering the devices on a computer network;
   defining a group, the group being representative of a networked multimedia system including the devices;
   providing, as a relative group leader for the group, a system control interface for receiving, from a control device, a system control signal indicative of an operational change to the group;
   receiving the system control signal;
   being responsive to the system control signal for providing respective corresponding device control signals to the devices to implement the operational change across the group;
   defining a zone, the zone being representative of two or more networked multimedia systems, one of the networked multimedia systems being that in respect of which the group is representative;
   providing, as a relative zone leader for the zone, a zone control interface for receiving, from a control device, a zone control signal indicative of an operational change to the zone;
   receiving the zone control signal; and
   being responsive to the zone control signal for providing respective corresponding device control signals to the devices to implement the operational change across the zone.

20. A non-transitory computer-readable medium as recited in claim 18 or 19, wherein at least some of the devices include a radio interface and wherein the network includes a wireless network.

21. A multimedia playback unit including:
   a networking interface for connecting to a computer network;
   a first processor for carrying out a discovery process on the computer network for allowing mutual discovery of the device, and one or more complementary devices;
   a second processor for determining whether the device is a group leader relative to the one or more complementary devices and, where the device is the group leader:
   defining a group representative of a networked multimedia system including the device and the one or more complementary devices;
   providing, for the group, a system control interface for receiving a system control signal indicative of an operational change to the multimedia system;
   receiving the system control signal; and
   being responsive to the system control signal for defining respective corresponding device control signals, and providing those signals to the devices thereby to implement the operational change across the multimedia system;
   a third processor for determining whether the device is a zone leader relative to the one or more complementary devices and one or more further groups of complementary devices and, where the device is the zone leader:
   defining a zone representative of a plurality of networked multimedia systems, wherein one of the networked multimedia systems includes the device and the one or more complementary devices, and wherein another of the networked multimedia systems includes a further set of complementary devices;
   providing, for the zone, a zone control interface for receiving, from a control device, a system control signal indicative of an operational change to the zone;
   receiving the zone control signal; and
   being responsive to the zone control signal for defining respective corresponding device control signals for the individual devices in the zone, and providing those device control signals to the devices thereby to implement the operational change across the zone.

22. A multimedia playback unit as recited in claim 21 including:
   an infrared port for receiving, from a control device, a control signal;
   a fourth processor for determining whether the control signal is a system control signal; and
   a fifth processor for, where the control signal is a system control signal, providing that control signal to the group and/or the zone.

23. A multimedia playback unit including:
   a networking interface for connecting to a computer network;
   a first processor for carrying out a discovery process on the computer network for allowing mutual discovery of the device, and the one or more complementary devices;
   a second processor for identifying a group leader among the device and the one or more complementary devices, and a zone leader among the one or more complementary devices;
   an infrared input for receiving, from a control device, a group control signal and a zone control signal;
   a fourth processor responsive to the control signal where the device is not the group leader for providing data over the network indicative of the group control signal to the group leader, wherein the group leader is responsive to the group control signal for providing respective corresponding device control signals group control signal across the group; and
   a fifth processor responsive to the zone control signal where the device is not the zone leader for providing data over the network indicative of the zone control signal to the zone leader, wherein the zone leader is responsive to the zone control signal for providing respective corresponding device control signals to implement zone control signal across the zone.

24. The multimedia playback unit as recited in any one of claims 21, 22, and 23, wherein the networking interface includes a radio interface and wherein the computer network is a wireless network.

25. A set of networked multimedia systems, each networked multimedia system including:
   a plurality of networked multimedia playback devices including a relative group leader, the group leader providing a system control interface for receiving, from a control device, a system control signal indicative of an operational change to the multimedia system, wherein the group leader is responsive to the system control signal for providing respective corresponding device control signals to each of the multimedia playback devices to implement the operational change across the multimedia system;
   wherein the set of networked multimedia systems include a relative zone leader, the zone leader providing a system control interface for receiving, from a control device, a zone control signal indicative of an operational change to the plurality of multimedia systems, wherein the zone leader is responsive to the zone control signal for providing respective corresponding device control signals to each of the multimedia playback devices to implement the operational change across the plurality of multimedia systems.

26. A plurality of networked multimedia systems as recited in claim 25,
wherein the set of networked multimedia systems include a relative zone leader, the zone leader providing a system control interface for receiving, from a control device, a system control signal indicative of an operational change to the plurality of multimedia systems, wherein the zone leader is responsive to the system control signal for providing respective corresponding device control signals to each of the multimedia playback devices to implement the operational change across the plurality of multimedia systems.

27. A networked multimedia system as recited in claims 14 or 25, wherein at least some of the devices include a radio interface and wherein the network includes a wireless network.

* * * * *